(12) United States Patent
Morita et al.

(10) Patent No.: US 7,975,168 B2
(45) Date of Patent: Jul. 5, 2011

(54) STORAGE SYSTEM EXECUTING PARALLEL CORRECTION WRITE

(75) Inventors: Seiki Morita, Odawara (JP); Yuko Matsui, Odawara (JP)

(73) Assignee: Hitachi, Ltd., Tokyo (JP)

(*) Notice: Subject to any disclaimer, the term of this patent is extended or adjusted under 35 U.S.C. 154(b) by 1296 days.

(21) Appl. No.: 11/581,337

(22) Filed: Oct. 17, 2006

(65) Prior Publication Data

US 2008/0126844 A1 May 29, 2008

(30) Foreign Application Priority Data

Aug. 18, 2006 (JP) ................................ 2006-223521

(51) Int. Cl.
*G06F 11/00* (2006.01)
(52) U.S. Cl. .................................. 714/6; 714/2; 714/42
(58) Field of Classification Search .................. 714/6, 2, 714/5, 25, 42
See application file for complete search history.

(56) References Cited

U.S. PATENT DOCUMENTS

| 2003/0093647 | A1* | 5/2003 | Mogi et al. ................ 712/1 |
| 2005/0050381 | A1* | 3/2005 | Maddock ................ 714/5 |
| 2005/0065894 | A1* | 3/2005 | Inaba ................ 705/400 |
| 2005/0114728 | A1* | 5/2005 | Aizawa et al. ................ 714/6 |
| 2005/0138315 | A1* | 6/2005 | Eguchi et al. ................ 711/162 |
| 2005/0210304 | A1* | 9/2005 | Hartung et al. ................ 713/320 |
| 2005/0283654 | A1* | 12/2005 | Wood et al. ................ 714/7 |
| 2006/0010343 | A1 | 1/2006 | Tanaka et al. |
| 2006/0212748 | A1* | 9/2006 | Mochizuki et al. ................ 714/6 |
| 2007/0101187 | A1* | 5/2007 | Daikokuya et al. ................ 714/6 |
| 2007/0179994 | A1* | 8/2007 | Deguchi et al. ................ 707/202 |
| 2007/0226533 | A1* | 9/2007 | Hafner et al. ................ 714/6 |

FOREIGN PATENT DOCUMENTS

| JP | 05-314674 | 11/1993 |
| JP | 2005-038271 | 2/2005 |

* cited by examiner

*Primary Examiner* — Scott T Baderman
*Assistant Examiner* — Sarai Butler
(74) *Attorney, Agent, or Firm* — Hitachi America, Ltd.

(57) ABSTRACT

If a failure occurs in any of a plurality of data disks, and if a controller receives a read request from a host computer for the RAID group including the failed data disk, the controller performs data recovery using data stored in the other data disks in the RAID group, and transmits the recovered data to the host computer and also writes the recovered data to a spare disk.

8 Claims, 8 Drawing Sheets

☒ RECOVERED
☐ NOT RECOVERED

| I/O WAITING TIME | I/O LOAD | CACHE UTILIZATION | MODE SETTING |
|---|---|---|---|
| 3.5sec | 250IOPS | 25% | ON | ized.
STORAGE SYSTEM EXECUTING PARALLEL CORRECTION WRITE

CROSS-REFERENCES TO RELATED APPLICATIONS

This application relates to and claims priority from Japanese Patent Application No. 2006-223521, filed on Aug. 18, 2006, the entire disclosure of which is incorporated herein by reference.

BACKGROUND

The present invention relates to a storage system having a plurality of storage devices in a redundant configuration.

Disk array systems having a plurality of disk drives configured based on RAID (Redundant Arrays of Independent Inexpensive Disks) run those disk drives in parallel to process data. For example, when receiving a write command from a host system, these disk array systems add redundant data to the relevant write data, and then distribute and write the data to several disk drives.

On the other hand, when receiving a read command from a host system, these disk array systems read in parallel the relevant data distributed and written to the respective disk drives, and send the read data to the host system. This type of disk array system is provided with a function to carry out error correction using the redundant data and shift to fallback operation if any of the plurality of disk drives configured based on RAID fails. In the fallback operation, because the redundancy level is low, data is normally recovered via correction-copy to a spare disk.

When data recovery to a spare disk is completed and the failed disk drive is manually replaced with a new disk drive, the disk array system copies data restructured in the spare disk back to the new disk drive.

Known references that refer to correction-copy to a spare disk include, for example, Japanese Patent Laid-open Publication No. 2005-38271 and Japanese Patent Laid-open Publication No. H05-314674.

SUMMARY

Correction-copy to a spare disk, which is performed when a failure occurs in a disk drive, is executed asynchronously with read/write from/to disk drives in response to an I/O request from a host computer (hereinafter referred to as a host I/O), and completed within a certain period of time. However, if the RAID group including the recovery target disk drive is under high host I/O load, correction-copy processing and host I/O processing compete with each other, resulting in performance deterioration in each processing.

Furthermore, load imbalance between each processing causes a problem in that either processing affects the performance of the other. For example, if the host I/O processing is prioritized and the correction-copy processing is suspended/interrupted, data recovery does not progress. Meanwhile, if the correction-copy processing is prioritized and the host I/O processing is suspended/interrupted, host I/O performance deteriorates.

In order to solve the above problems, an object of the present invention is to enable execution of both correction-copy processing to a spare device performed when a failure occurs in a storage device and read/write processing targeting storage devices in response to an I/O request from a host computer efficiently in a balanced manner, thereby achieving improved performance.

In order to achieve the above object, a storage system according to the present invention includes: a plurality of storage devices for providing one or more RAID groups with a storage area; one or more spare devices; and a controller for controlling data input/output to/from the storage devices in response to an I/O request from a host computer. If a failure occurs in any of the plurality of storage devices, the controller performs, upon the receipt of a read request from the host computer for the RAID group including the failed storage device, data recovery using data stored in the other storage devices in the same RAID group as the failed storage device, and transmits the recovered data to the host computer and also writes the recovered data to the spare device.

By performing correction-write to a spare device using the data that has been recovered for data-read in response to a request from a host computer, it is possible to execute host access processing and data recovery processing in parallel, and thereby to achieve efficient data recovery.

In the above storage system, the controller preferably sets an execution rate per unit time for first correction-write and for second correction-write, in accordance with host I/O characteristics or the storage system load status. As a result, efficient data recovery can be achieved.

Examples of the host I/O characteristics include: information concerning a time period during which no I/O request has been issued from the host computer to the RAID group including the failed storage device; and information concerning whether the I/O request from the host computer to the RAID group including the failed storage device is sequential-access or random-access. Examples of the storage system load status include: I/O load to the RAID group including the failed storage device; and cache utilization of dirty data that has not been destaged to the RAID group including the failed storage device.

A storage system according to another aspect of the invention includes: a plurality of storage devices for providing one or more RAID groups with a storage area; one or more spare devices; and a controller for controlling data input/output to/from the storage devices in response to an I/O request from a host computer. If a failure occurs in any of the plurality of storage devices, the controller executes first correction-write and second correction-write in parallel, with: the first correction-write being executed, upon the receipt of a read request from the host computer for the RAID group including the failed storage device, by performing data recovery using data stored in the other storage devices in the same RAID group as the failed storage device, and transmitting the recovered data to the host computer and also writing the recovered data to the spare device; and the second correction-write being executed by performing data recovery using data stored in the other storage devices in the same RAID group as the failed storage device, and writing the recovered data to the spare device.

By executing the first correction-write and the second correction-write in parallel, any storage area for which data recovery has been completed in the first correction-write can be skipped in the second correction-write, and accordingly, efficient data recovery can be achieved.

The controller preferably sets an execution rate per unit time for the first correction-write and for the second correction-write, in accordance with host I/O characteristics or the storage system load status.

Accordingly, by executing the correction-copy processing to a spare device performed when a failure occurs in a storage device and read/write processing targeting storage devices in response to an I/O request from a host computer efficiently in a balanced manner, performance deterioration can be minimized.

A storage system according to another aspect of the invention includes: a plurality of storage devices for providing one or more RAID groups with a storage area; one or more spare devices; and a controller for controlling data input/output to/from the storage devices in response to an I/O request from a host computer. If any of the plurality of storage devices has an access error rate exceeding a predetermined threshold, the controller executes first correction-write and second correction-write in parallel, with: the first correction-write being executed, upon the receipt of a read request from the host computer for the RAID group including the storage device whose access error rate exceeds the predetermined threshold, by reading data from the storage device whose access error rate exceeds the predetermined threshold and transmitting the read data to the host computer, and also writing the data read from the storage device whose access error rate exceeds the predetermined threshold to the spare device; and the second correction-write being executed by copying data stored in the storage device whose access error rate exceeds the predetermined threshold to the spare device.

A storage system according to another aspect of the invention includes: a plurality of storage devices for providing one or more RAID groups with a storage area; one or more spare devices; and a controller for controlling data input/output to/from the storage devices in response to an I/O request from a host computer. If a failure occurs in any of the plurality of storage devices, the controller performs data recovery via first data recovery processing if the host I/O request for the RAID group including the failed storage device is random-access, while the controller performs data recovery via second data recovery processing if the host I/O request for the RAID group including the failed storage device is sequential-access.

In the above storage system, the first data recovery processing is processing where first processing and second processing are executed in parallel, with: the first processing being executed, upon the receipt of a read request from the host computer for the RAID group including the failed storage device, by performing data recovery using data stored in the other storage devices in the same RAID group as the failed storage device and transmitting the recovered data to the host computer; and the second processing being executed by performing data recovery using data stored in the other storage devices in the same RAID group as the failed storage device and writing the recovered data to the spare device.

The second data recovery processing is processing where first correction-write and second correction-write are executed in parallel, with: the first correction-write being executed, upon the receipt of a read request from the host computer for the RAID group including the failed storage device, by performing data recovery using data stored in the other storage devices in the same RAID group as the failed storage device, and transmitting the recovered data to the host computer and also writing the recovered data to the spare device; and the second correction-write being executed by performing data recovery using data stored in the other storage devices in the same RAID group as the failed storage device, and writing the recovered data to the spare device.

According to the present invention, by executing correction-copy processing to a spare device performed when a failure occurs in a storage device and read/write processing targeting storage devices in response to an I/O request from a host computer efficiently in a balanced manner, it is possible to minimize deterioration in the host I/O performance and any increase in the recovery time when a failure occurs in a storage device.

Other aspects and advantages of the invention will be apparent from the following description and the appended claims.

DETAILED DESCRIPTION OF PREFERRED EMBODIMENTS

A storage system according to an embodiment of the invention includes: a plurality of storage devices for providing one or more RAID groups with a storage area; one or more spare devices; and a controller for controlling data input/output to/from the storage devices in response to an I/O request from a host computer.

If a failure occurs in any of the storage devices that provide a storage area for the RAID group(s), the controller executes data recovery processing. The data recovery processing includes first correction-write and second correction-write: the first correction-write is executed, in response to an I/O request from the host computer, to recover data via parity calculation using data read out from the other storage devices in the same RAID group as the failed storage device, and transmit the recovered data to the host computer, and also to write that recovered data to the spare device; and the second correction-write is executed to recover data via parity calculation using data read out from the other storage devices in the same RAID group as the failed storage device, and write the recovered data to the spare device.

The controller manages for which storage areas data recovery has been completed via the first and second correction-write, for example, using a bitmap table. Any storage area for which data recovery has been completed via the first correction-write will be skipped in data recovery via the second correction-write.

The controller ideally checks the characteristics of the host I/O to determine whether the host I/O is sequential-access or random-access, prioritizes data recovery via the first correction-write if it is sequential-access and prioritizes data recovery via the second correction-write if it is random-access. If the host I/O is sequential-access, performing correction-write to the spare device using the data that has been recovered for data-read enables parallel execution of the host access processing and the data recovery processing, resulting in efficient data recovery. On the other hand, if the host I/O is random-access, prioritizing data recovery via the second correction-write can eliminate data recovery management in smaller storage area units, resulting in easy data recovery progress management.

The controller may also set an execution rate per unit time for the first and the second correction-write, in accordance with the host I/O characteristics and the storage system load status.

In the above storage system, the storage devices or spare device are, for example, physical devices such as hard disks, flexible disks, magnetic tapes, semiconductor memory, flash memory, optical disks, etc.

Figure 1:
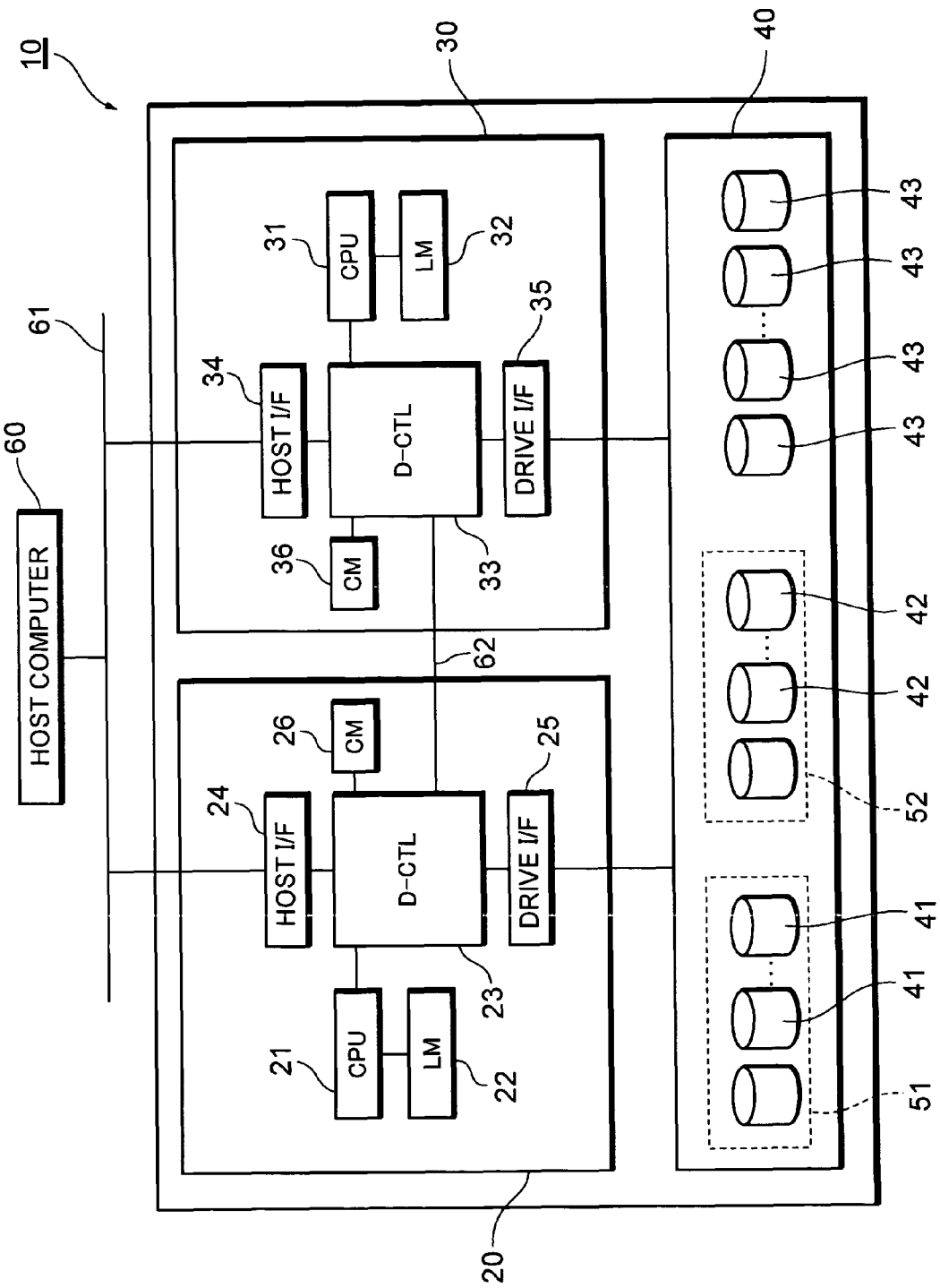
FIG. 1 is a diagram showing the major configuration of a storage system according to an embodiment of the present invention.

Next, an embodiment of the present invention will be described below, with reference to the attached drawings. FIG. 1 shows the major configuration of a storage system 10 according to this embodiment. The storage system 10 is connected to one or more host computers 60 via a communication network 61. The host computer 60 is a personal computer, workstation, mainframe, or similar. The host computer 60 has, for example, web application software, streaming application software, e-business application software, etc., installed.

Examples of the communication network 61 include a SAN (Storage Area Network), a LAN (Local Area Network), a WAN (Wide Area Network), the Internet, a dedicated line, a public line, and the like. If the host computer 60 is connected to the storage system 10 via a SAN, the host computer 60 uses Fibre Channel Protocol, iSCSI (internet Small Computer System Interface), or another such protocol to request data input/output in blocks, which are units for managing data in the storage resources in the storage system 10. If the host computer 60 is connected to the storage system 10 via a LAN, the host computer 60 uses NFS (Network File System), CIFS (Common Interface File System), or another such protocol to request data input/output in files, designating a file name. In order to receive file access requests from the host computer 60, the storage system 10 needs to be provided with a NAS (Network Attached Storage) function.

The storage system 10 has duplexed controllers 20 and 30, and a storage apparatus 40.

The storage apparatus 40 includes: a plurality of data disks 41 for providing a storage area for a RAID group 51; a plurality of data disks 42 for providing a storage area for a RAID group 52; and one or more spare disks 43. Various types of disk drives can be used for the data disks 41 and 42, and the spare disks 43—for example, FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SCSI (Small Computer System Interface) disk drives, etc.

The RAID group 51 is configured, for example, by grouping four data disks 41 (3D+1P), or by grouping eight data disks 41 (7D+1P). In other words, the storage areas provided by each of the plurality of data disks 41 are collected to form one RAID group 51.

Likewise, the RAID group 52 is configured, for example, by grouping four data disks 42 (3D+1P), or by grouping eight data disks 42 (7D+1P). In other words, the storage areas provided by each of the plurality of data disks 42 are collected to form one RAID group 52.

The controller 20 or 30 can control the storage apparatus 40 in accordance with a so-called RAID level (e.g. level 0, 1 or 5) specified according to RAID methodology. In each RAID group, one or more logical units are defined, each logical unit being a unit of access from the host computer 60. The logical units are assigned their LUNs (Logical Unit Numbers).

The controller 20 mainly includes a CPU 21, local memory (LM) 22, a data transfer controller (D-CTL) 23, a host I/F controller 24, a drive I/F controller 25, and cache memory (CM) 26.

The CPU 21 is a processor for controlling I/O processing (write access or read access) for the storage apparatus 40 in response to data input/output requests from the host computer 60. The local memory 22 stores a microprogram for the CPU 21, and also stores a bitmap table 200 (see FIG. 4) and a management table 400 (see FIG. 5), both explained later. The cache memory 26 is buffer memory for temporarily storing write data to be written to the storage apparatus 40, or read data having been read from the storage apparatus 40. The cache memory 26 is provided with a backup power supply, and configured so that the cache data will not be lost even if a power failure occurs in the storage system 10.

The data transfer controller 23 connects the host I/F controller 24, drive I/F controller 25 and cache memory 26 with one another, and controls data transfer between the host computer 60 and the storage apparatus 40. More specifically, upon write-access by the host computer 60, the data transfer controller 23 writes the write data, which has been received from the host computer 60 via the host I/F controller 24, to the cache memory 26. The write data written to the cache memory 26 is written to the storage apparatus 40 by the drive I/F controller 25. Meanwhile, upon read-access by the host computer 60, the data transfer controller 23 writes the read data, which has been read from the storage apparatus 40 via the drive I/F controller 25, to the cache memory 26, and also transfers that read data to the host I/F controller 24.

The host I/F controller 24 is a controller for controlling the interface between the host computer 60 and the controller 20, and functions, for example, to receive block access requests from the host computer 60 based on Fibre Channel Protocol, and file access requests from the host computer 60 based on a file transfer protocol. The drive I/F controller 25 is a controller for controlling the interface between the controller 20 and the storage apparatus 40, and functions, for example, to control data input/output requests directed to the storage apparatus 40 in accordance with a protocol that controls the storage apparatus 40.

The controller 30 includes a CPU 31, local memory (LM) 32, a data transfer controller (D-CTL) 33, a host I/F controller 34, a drive I/F controller 35, and cache memory (CM) 36, and has the same configuration as the controller 20.

The data transfer controllers 23 and 33 are connected to each other via a data bus 62, and data is transferred between the data transfer controllers 23 and 33 so that some data written to the cache memory 26 of one controller is also written to the cache memory 36 of the other controller. Also, if the storage apparatus 40 is managed at RAID level 5, the data transfer controllers 23 and 33 calculate parity data.

Figure 2:
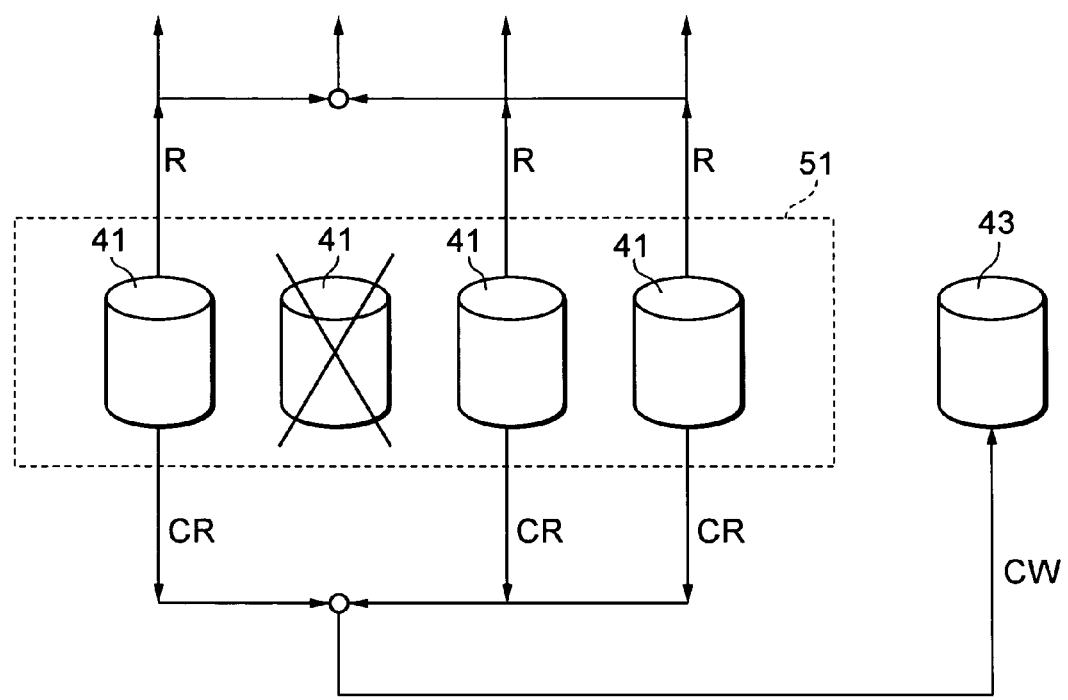
FIG. 2 is an explanatory diagram showing the outline of processing in first data recovery processing.
Figure 3:
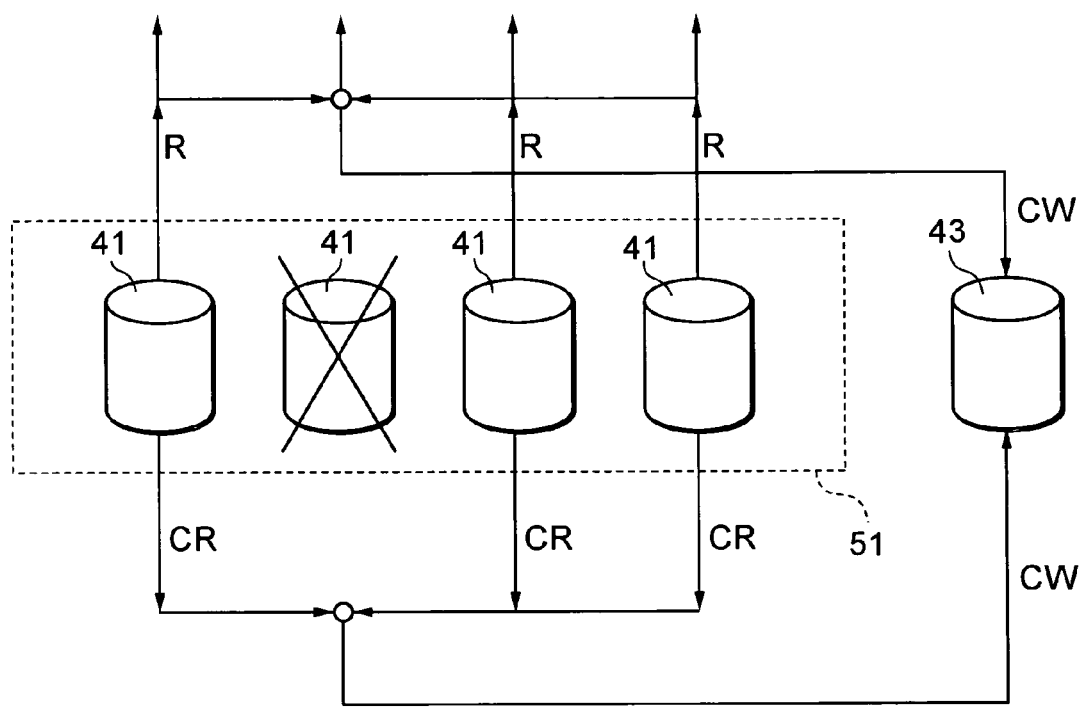
FIG. 3 is an explanatory diagram showing the outline of processing in second data recovery processing.

Referring now to FIGS. 2 and 3, a data recovery method according to this embodiment will be briefly explained. The same reference numerals as used in FIG. 1 indicate the same devices, and so their detailed explanation has been omitted. Also, in FIGS. 2 and 3, "R," "CR" and "CW" mean "read," "correction-read" and "correction-write," respectively. In addition, in this specification, correction-copy and correction-write have the same meaning.

FIG. 2 shows the outline of processing in first data recovery processing. The first data recovery processing is as follows: if a failure occurs in any of the data disks 41 that belong to the RAID group 51, and if a host I/O request is made for the RAID group 51, data recovery is performed via parity calculation using data stored in the other data disks 41 (including a parity disk) in the RAID group 51 to execute data-read; while, separately, in the background of the above data recovery for data-read, data recovery for correction-write is also performed to execute correction-write to the spare disk 43. The first data recovery processing is different from the below-explained second data recovery processing, in that data is recovered for correction-write to the spare disk 43 separately from the recovery of data from the data disks 41 in response to the host I/O request.

FIG. 3 shows the outline of processing in second data recovery processing. The second data recovery processing is as follows: if a failure occurs in any of the data disks 41 that belong to the RAID group 51, and if a host I/O request is made for the RAID group 51, data recovery is performed via parity calculation using data stored in the other data disks 41 (including a parity disk) in the RAID group 51 to execute data-read, and that data recovered for data-read is also used to execute correction-write to the spare disk 43; and furthermore, separately, in the background of the above data recovery for data-read, data recovery for correction-write is also performed to execute correction-write to the spare disk 43. The second data recovery processing is different from the above-described first data recovery processing in that correction-write to the spare disk 43 is executed using the data recovered from the data disks 41 in response to the host I/O request.

In the second data recovery processing, two types of correction-write are executed in parallel: correction-write to the spare disk 43 executed using the data that has been recovered for data-read in response to the host I/O request (hereinafter referred to as "host-correction-write (host CW)" for convenience); and correction-write to the spare disk 43 executed using the data recovered for correction-write (hereinafter referred to as "background-correction-write (background CW)" for convenience).

In host-correction-write, correction-write to the spare disk 43 is executed using the data that has been recovered for data-read in response to the host I/O request. So, if the host I/O request is sequential-read, data recovery is completed for several sequential unit storage areas in the failed data disk 41. If the host I/O request is random-read, data recovery is completed for one or more unit storage areas distributed to each region in the failed data disk 41. In other words, unless read/write requests have been made for all storage areas in the data disk 41, executing only host-correction-write cannot achieve complete data recovery.

Meanwhile, in background-correction-write, data that has been recovered for correction-write is written to the spare disk 43, so data recovery can be realized for all storage areas in the data disk 41, without exception. As for the order for recovering data, a suitable way is, for example, to recover data in each unit storage area in the order of their logical block addresses. In this way, by executing correction-write to the spare disk 43 using the data that has been recovered for data-read in response to the host I/O request, efficient data recovery can be realized, and also, by recovering data via background-correction-write for any storage area for which complete data recovery cannot be performed via host-correction-write, data can be expected to be completely recovered.

Figures 4, 5:
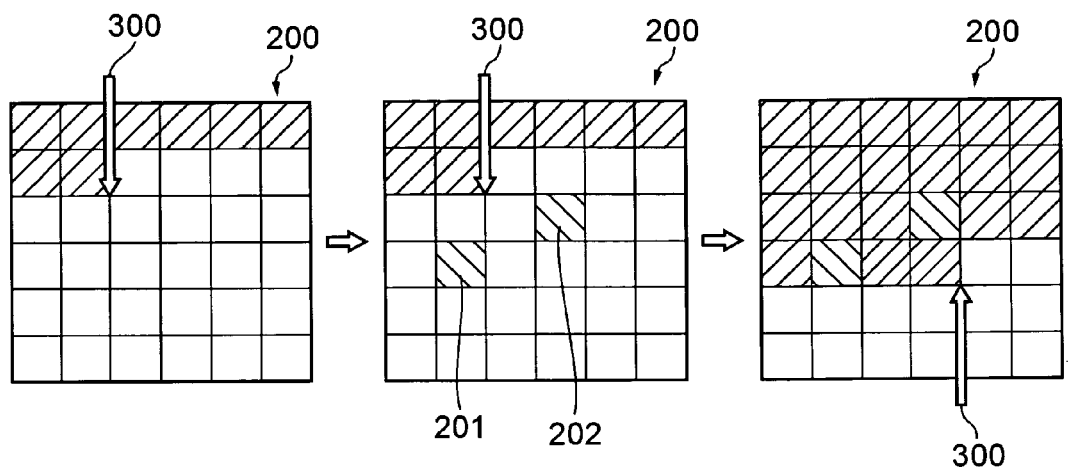
FIG. 4 is an explanatory diagram showing the outline of bitmap-control of data recovery progress.
FIG. 5 is an explanatory diagram of a management table.

To execute host-correction-write and background-correction-write in parallel, it is necessary to manage what range of data has been recovered in the data stored in the failed data disk 41. As shown in FIG. 4, the controller 20 or 30 uses a bitmap table 200 to manage what range of data has been recovered in the data stored in the failed data disk 41. Each bit in the bitmap table 200 is associated with each unit storage area in the data disk 41. For example, if the data disk 41 has a storage capacity of A bytes, and the unit storage area has B bytes, A/B bits of data will be arranged in the bitmap table 200. Each bit arranged in the bitmap table 200 has a value of "0" (initial value) if data recovery has not been completed for the associated unit storage area, and has a value of "1" if data recovery has been completed for the associated unit storage area.

A pointer 300 indicates the bit position associated with the unit storage area for which data recovery has been completed the most recently in several unit storage areas whose data has been recovered via background-correction-write. Numerals 201 and 202 show the bits associated with the unit storage areas for which data recovery has been completed via host-correction-write. Data recovery via host-correction-write is executed for a unit storage area for which a read request has been made, so a random read request results in distributed data recovery as shown in FIG. 4. When recovering data via background-correction-write, the controller 20 or 30 skips any unit storage area for which data has already been recovered via host-correction-write, and recovers data via background-correction-write only for the unit storage areas for which data has not yet been recovered. By referring to the pointer 300, the controller 20 or 30 can find a data recovery resumption point (a unit storage area to be subjected to data recovery first).

The size of the unit storage area is preferably set to an appropriate value according to the host I/O characteristics. For example, if the host I/O is mostly sequential-access, data recovery can progress efficiently via host-correction-write. So, setting a larger size of the unit storage area facilitates data recovery management. On the other hand, if the host I/O is mostly random-access, data recovery does not progress efficiently via host-correction-write, so it is better to set a smaller size of the unit storage area.

When following the second data recovery processing and recovering data via the parallel execution of host-correction-write and background-correction-write, it is preferable that the respective priority levels for host-correction-write and background-correction-write can be set and changed in accordance with the host I/O characteristics or the storage system 10 load status. Using a management table 400 as shown in FIG. 5, the controller 20 or 30 sets and changes the respective priority levels for host-correction-write and background-correction-write. The management table 400 stores information concerning the host I/O characteristics and the storage system 10 load status. As examples of the information concerning the host I/O characteristics and the storage system 10 load status, the table in FIG. 5 shows "I/O waiting time," "I/O load," "cache utilization," and "mode setting," but is not limited to those examples. The "I/O waiting time" indicates a time period during which no host I/O requests have been issued from the host computer 60 to the RAID group 51 or 52. The "I/O load" indicates the number of host I/O requests issued from the host computer 60 to the RAID group 51 or 52 per unit time. The "cache utilization" indicates the proportion of the capacity of the storage area that stores dirty data, which has not been destaged to the RAID group 51 or 52, to the total storage capacity of the cache memory 26 or 36. The "mode setting" indicates whether a host I/O priority mode is set or not. If the host I/O priority mode is set, host-correction-write is prioritized over background-correction-write.

Figure 6:
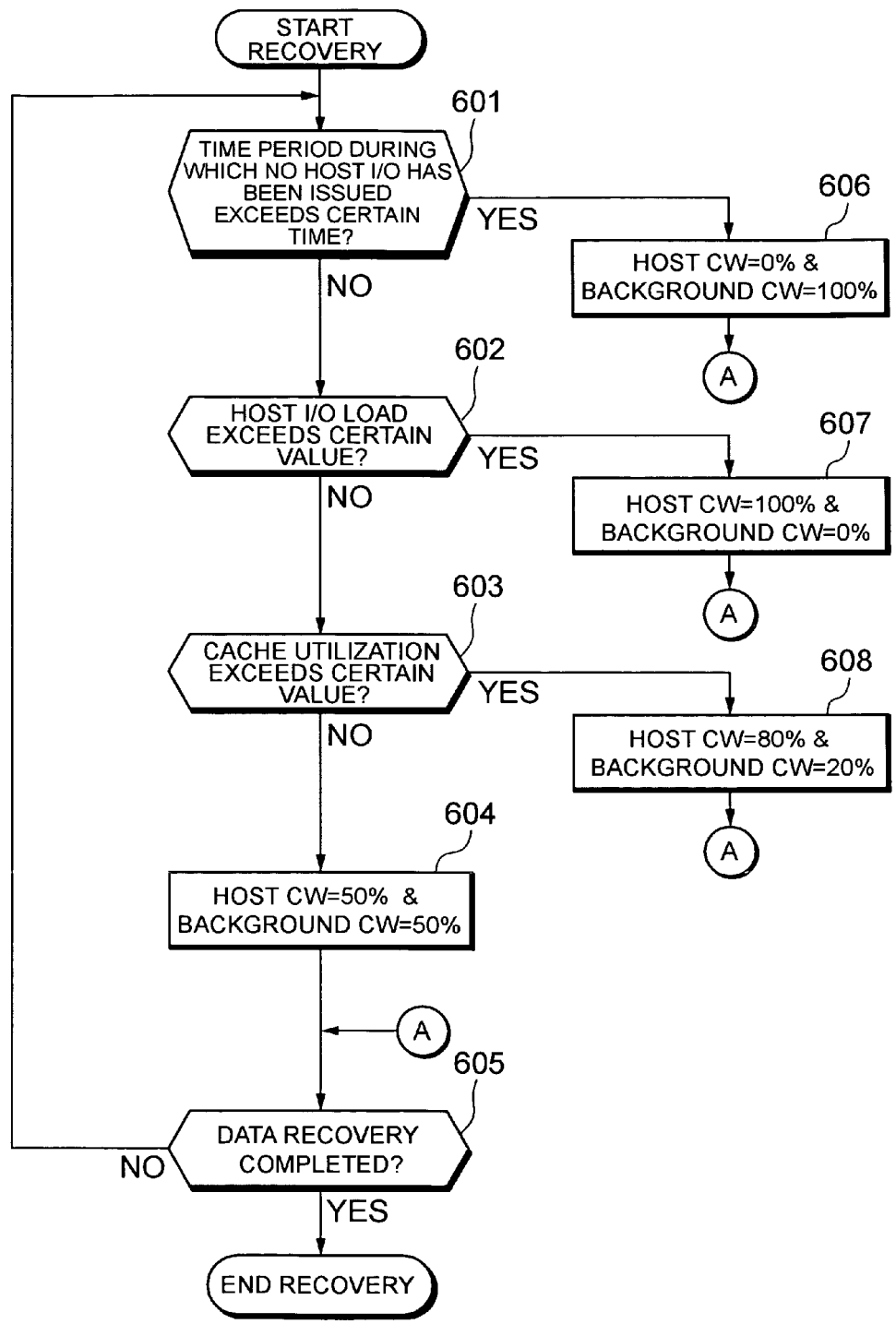
FIG. 6 is a flowchart showing data recovery processing according to the embodiment above.

FIG. 6 is a flowchart showing data recovery processing according to this embodiment. For convenience of explanation, the below description is based on the assumption that a failure has occurred in one data disk 41 in the RAID group 51 and the controller 20 is going to recover data using the second data recovery processing.

The controller 20 determines whether the time period during which no host I/O has been issued to the RAID group 51 exceeds a certain time (e.g. five seconds) or not (step 601).

If the time period during which no host I/O has been issued to the RAID group 51 exceeds a certain time (step 601; YES), data cannot be expected to be recovered via host-correction-write. So, the controller 20 sets the priority level of background-correction-write higher than that of host-correction-write (step 606). For example, the background-correction-write priority level is set to 100%, and the host-correction-write priority level is set to 0%.

If the time period during which no host I/O has been issued to the RAID group 51 does not exceed a certain time (step 601; NO), the controller 20 determines whether the host I/O load to the RAID group 51 exceeds a threshold (for example, 200-300 IOPS) or not (step 602).

If the host I/O load to the RAID group 51 exceeds a threshold (step 602; YES), data can be expected to be recovered efficiently via host-correction-write, so the controller 20 sets the priority level of host-correction-write higher than that of background-correction-write (step 607). For example, the host-correction-write priority level is set to 100%, and the background-correction-write priority level is set to 0%.

If the host I/O load to the RAID group 51 does not exceed a threshold (step 602; NO), the controller 20 determines whether the cache utilization of the dirty data that has not been destaged to the RAID group 51 exceeds a threshold (for example, 30-40%) or not (step 603).

If the cache utilization exceeds a threshold (step 603; YES), it is necessary to prevent deterioration in the host I/O performance and prioritize the host I/O processing. So, the controller 20 sets the host-correction-write priority level higher than the background-correction-write priority level (step 608). For example, the host-correction-write priority level is set to 80%, and the background-correction-write priority level is set to 20%.

If the cache utilization does not exceed a threshold (step 603; NO), the controller 20 sets the host-correction-write priority level almost the same as the background-correction-write priority level (step 604). For example, the host-correction-write priority level and the background-correction-write priority level are both set to 50%.

After that, the controller 20 determines whether data recovery has been completed (step 605). If data recovery has not been completed (step 605; NO), the controller 20 goes back to the process in step 601, and if data recovery has been completed (step 605; YES), the controller 20 ends the data recovery processing.

Here, additional explanation is made about what the priority level means. The priority level indicates the proportion in time of jobs executed per certain unit time. For example, if the host-correction-write priority level is set to 80% and the background-correction-write priority level is set to 20%, the proportion in time of host-correction-write executed per certain unit time will be 80%, and that of background-correction-write will be 20%.

Figure 7:
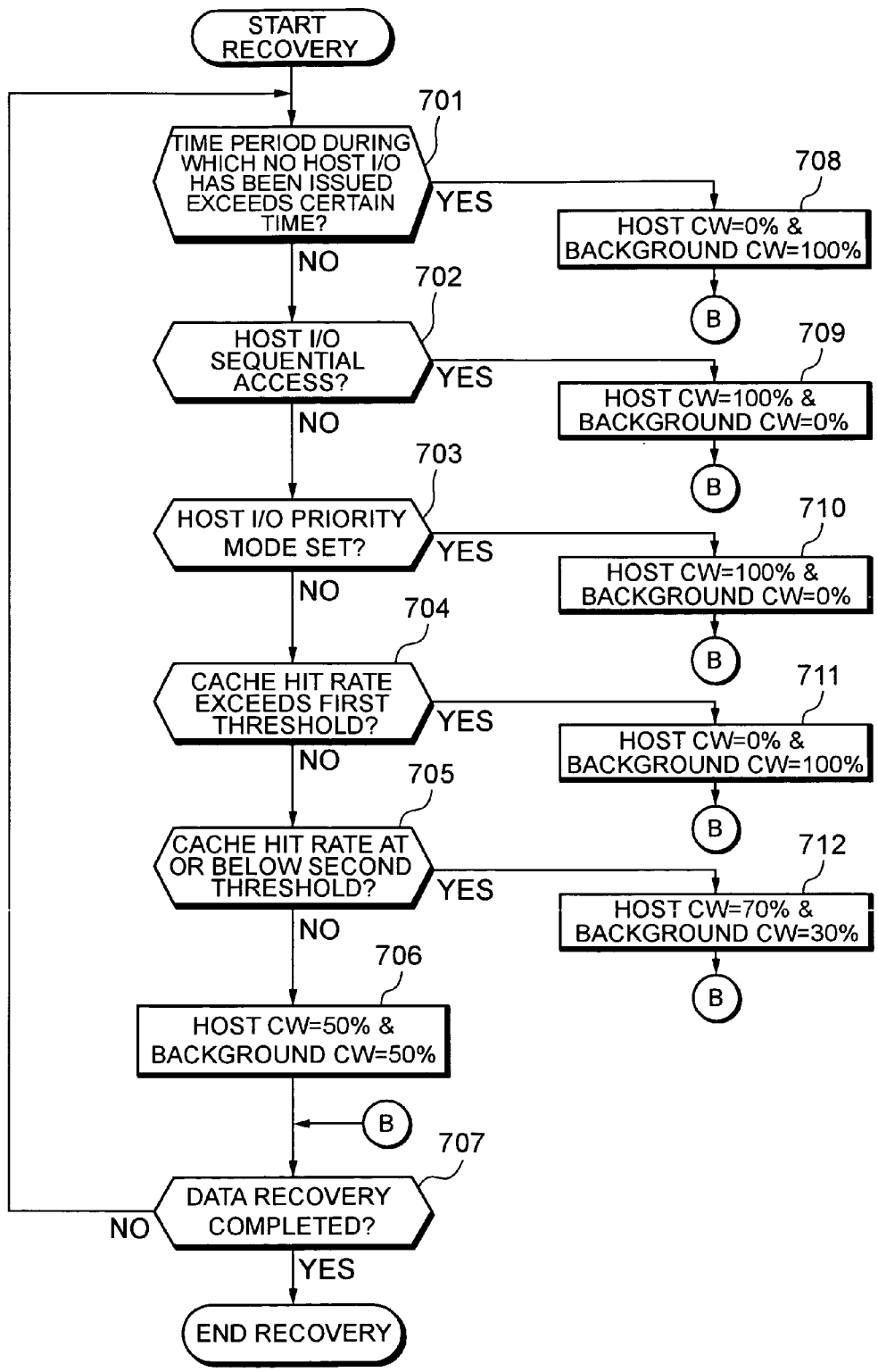
FIG. 7 is a flowchart showing data recovery processing according to the embodiment above.

FIG. 7 is a flowchart showing other data recovery processing according to this embodiment. For convenience of explanation, the below description is based on the assumption that a failure has occurred in one data disk 41 in the RAID group 51 and the controller 20 is going to recover data using the second data recovery processing.

The controller 20 determines whether the time period during which no host I/O has been issued to the RAID group 51 exceeds a certain time (e.g. five seconds) or not (step 701).

If the time period during which no host I/O has been issued to the RAID group 51 exceeds a certain time (step 701; YES), data cannot be expected to be recovered via host-correction-write. So, the controller 20 sets the priority level of background-correction-write higher than that of host-correction-write (step 708). For example, the background-correction-write priority level is set to 100%, and the host-correction-write priority level is set to 0%.

If the time period during which no host I/O has been issued to the RAID group 51 does not exceed a certain time (step 701; NO), the controller 20 determines whether host I/O to the RAID group 51 is sequential-access or not (step 702).

If host I/O to the RAID group 51 is sequential-access (step 702; YES), data can be expected to be recovered efficiently via host-correction-write, so the controller 20 sets the priority level of host-correction-write higher than that of background-correction-write (step 709). For example, the host-correction-write priority level is set to 100%, and the background-correction-write priority level is set to 0%.

If host I/O to the RAID group 51 is not sequential-access (step 702; NO), the controller 20 determines whether host I/O priority mode has been set or not (step 703).

If host I/O priority mode has been set (step 703; YES), the controller 20 sets the host-correction-write priority level higher than the background-correction-write priority level (step 710). For example, the host-correction-write priority level is set to 100%, and the background-correction-write priority level is set to 0%.

If no host I/O priority mode has been set (step 703; NO), the controller 20 determines whether the host I/O cache hit rate exceeds a first threshold (e.g. 90%) or not (step 704).

If the host I/O cache hit rate exceeds a first threshold (step 704; YES), this shows that the host I/O, even though it is random-access, has a high cache hit rate. So, data cannot be expected to be recovered via host-correction-write, and it is necessary to proceed with data recovery via background-correction-write. The controller 20 sets the background-correction-write priority level higher than the host-correction-write priority level (step 711). For example, the background-correction-write priority level is set to 100%, and the host-correction-write priority level is set to 0%.

If the host I/O cache hit rate does not exceed a first threshold (step 704; NO), the controller 20 determines whether the host I/O cache hit rate is at or lower than a second threshold (e.g. 10%) (step 705).

If the host I/O cache hit rate is at or lower than a second threshold (step 705; YES), data can be expected to be recovered via host-correction-write, even though the host I/O is random-access. However, since the host I/O is not sequential-access, data recovery needs to be carried out via background-correction-write to some extent. The controller 20 sets the host-correction-write priority level higher than the background-correction-write priority level (step 712). For example, the host-correction-write priority level is set to 70%, and the background-correction-write priority level is set to 30%.

If the host I/O cache hit rate is not at or lower than a second threshold (step 705; NO), the controller 20 sets the host-correction-write priority level almost the same as the background-correction-write priority level (step 706). For example, the host-correction-write priority level and the background-correction-write priority level are both set to 50%.

After that, the controller 20 determines whether data recovery has been completed (step 707). If data recovery has not been completed (step 707; NO), the controller 20 goes back to the process in step 701, and if data recovery has been completed (step 707; YES), the controller 20 ends the data recovery processing.

Figure 8:
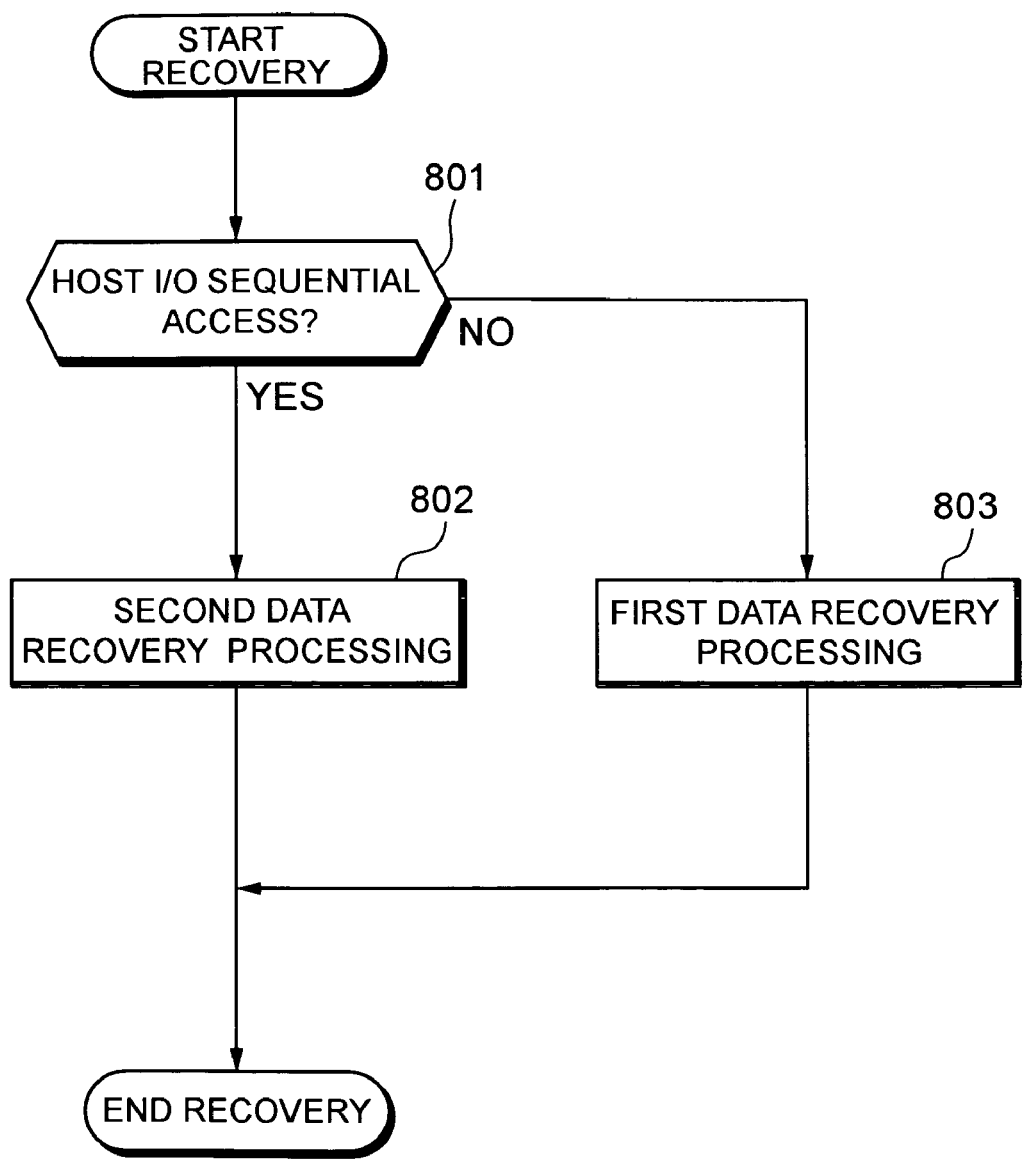
FIG. 8 is a flowchart showing data recovery processing according to the embodiment above.

FIG. 8 is a flowchart showing other data recovery processing according to this embodiment. The above-explained examples (FIGS. 6 and 7) are examples where, based on the premise that data is recovered using the second data recovery processing, the respective priority levels for host-correction-write and background-correction-write are set and changed in accordance with the host I/O characteristics and the storage system 10 load status. Meanwhile, in this example, data is recovered using the first and second data recovery processing, switching between the two types of processing according to the host I/O characteristics. For convenience of explanation, the below description is based on the assumption that a failure has occurred in one data disk 41 in the RAID group 51 and the controller 20 is going to recover data.

The controller 20 determines whether host I/O to the RAID group 51 is sequential-access or not (step 801). If it is sequential-access (step 801; YES), the controller 20 recovers data based on the second data recovery processing (step 802). On the other hand, if it is not sequential-access (step 801; NO), the controller 20 recovers data based on the first data recovery processing (step 803).

For example, when reproducing streaming data such as moving pictures, the host I/O request is sequential-access. So, performing correction-write to the spare disk 43 using the data that has been recovered for data-read does not deteriorate the host I/O performance, and enables efficient data recovery.

Figure 9:
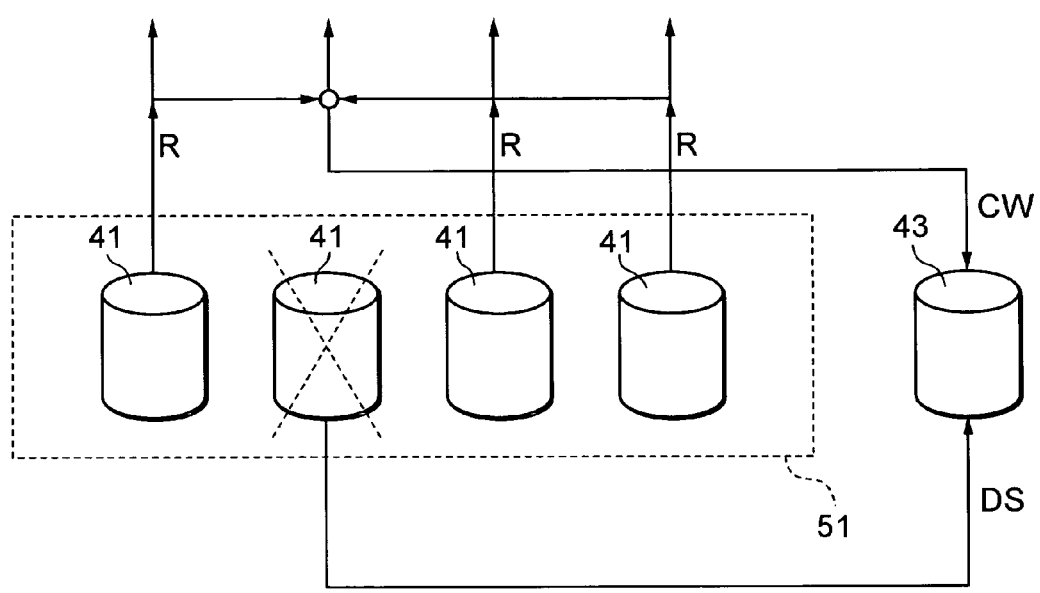
FIG. 9 is an explanatory diagram showing the outline of processing in second data recovery processing.

The above description is based on the assumption that a failure has occurred in one data disk 41 in the RAID group 51. However, the data recovery processing according to this embodiment can also be applied to the case where one data disk 41 in the RAID group 51 has an access error rate exceeding a predetermined threshold. As shown in FIG. 9, if the controller 20 or 30 detects a data disk 41 in the RAID group 51 having an access error rate exceeding a predetermined threshold, the controller 20 or 30 copies the data in that data disk 41 to the spare disk 43 before the data disk 41 actually fails (hereinafter referred to as "dynamic sparing"). "DS" in FIG. 9 shows dynamic sparing.

The above description explains, as a specific example of background-correction-write, data recovery via parity calculation using the data stored in the other data disks 41 (including a parity disk) in the RAID group 51. However, this embodiment can also be applied to data recovery using dynamic sparing. When carrying out background-correction-write via dynamic sparing too, data recovery progress is managed using a bitmap table 200, the respective priority levels for host-correction-write and background-correction-write are set and changed in accordance with the host I/O characteristics and the storage system 10 load status, like in the above-described examples.

According to this embodiment, by performing correction-write to the spare disk 43 using the data that has been recovered for data-read in response to the I/O request from the host computer 60, host access processing and data recovery processing can be executed in parallel, resulting in efficient data recovery.

Also, by executing host-correction-write and background-correction-write in parallel, it is possible to recover data via background-correction-write for any storage area for which data cannot be recovered via host-correction-write, resulting in efficient data recovery.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage system comprising:
a plurality of storage devices for providing one or more RAID groups;
one or more spare devices; and
a controller for controlling data input/output to/from the storage devices in response to an I/O request from a host computer and managing a plurality of unit storage areas on each of the plurality of storage devices,
wherein, if a failure occurs in a first storage device included in a first RAID group, the controller executes first correction-write for recovering data corresponding to the I/O request from a host computer and second correction-write for recovering whole data of the failed first storage device, in parallel,
wherein the first correction-write being executed, upon the receipt of a read request from the host computer for the first RAID group including the first failed storage device, by: recovering data for each unit storage area corresponding to the read request and stored in the failed first storage device, using data stored in the other storage devices in the first RAID group, transmitting the recovered data to the host computer, and writing the recovered data to the spare device, and
the second correction-write being executed by: recovering data for each unit storage area, which stored in the failed first storage device, using data stored in the other storage devices in the first RAID group in order of logical block address of each unit storage area of the failed first storage device, and writing the recovered data to the spare device,
wherein if the first RAID group receives from the host computer less sequential-access compared to random-access, the controller sets a first size as a size of each unit storage area,
wherein if the first RAID group receives from the host computer more sequential-access compared to random-access, the controller sets a second size, which is larger than the first size, as a size of each unit storage area, and prioritizes the first correction-write over the second correction-write.

2. The storage system according to claim 1,
wherein the controller sets an execution rate per unit time for the first correction-write and second correction-write, in accordance with host I/O characteristics or the storage system load status.

3. The storage system according to claim 2,
wherein the host I/O characteristics include: information concerning a time period during which no I/O request has been issued from the host computer to the RAID group including the failed storage device; or information concerning whether the I/O request from the host computer to the RAID group including the failed storage device is sequential-access or random-access, and
wherein the storage system load status includes: I/O load to the RAID group including the failed storage device; or cache utilization of dirty data that has not been destaged to the RAID group including the failed storage device.

4. The storage system according to claim 3,
wherein, if the time period during which no I/O request has been issued from the host computer to the RAID group including the failed storage device exceeds a predetermined threshold, the controller prioritizes the second correction-write over the first correction-write.

5. The storage system according to claim 3,
wherein, if the I/O load from the host computer to the RAID group including the failed storage device exceeds a predetermined threshold, the controller prioritizes the first correction-write over the second correction-write.

6. The storage system according to claim 3, wherein, if the cache utilization of the dirty data that has not been destaged to the RAID group including the failed storage device exceeds a predetermined threshold, the controller prioritizes the first correction-write over the second correction-write.

7. The storage system according to claim 3, wherein, if an operation mode is established for prioritizing the I/O request from the host computer to the RAID group including the failed storage device, the controller prioritizes the first correction-write over the second correction-write.

8. The storage system according to claim 1, wherein the controller skips, during data recovery via the second correction-write, any storage area for which data recovery has been completed via the first correction-write.

* * * * *